United States Patent [19]

Huempfner et al.

[11] 4,037,291
[45] July 26, 1977

[54] CASTER AND SWIVEL LOCK ASSEMBLY

[75] Inventors: David F. Huempfner, Kewaunee; Richard C. Tringali, Manitowoc, both of Wis.

[73] Assignee: American Hospital Supply Corporation, Evanston, Ill.

[21] Appl. No.: 715,979

[22] Filed: Aug. 19, 1976

[51] Int. Cl.² .................. B60B 33/00; B60B 33/02
[52] U.S. Cl. ................................... 16/35 R; 16/35 D
[58] Field of Search .................. 280/79.1, 33.99 C; 188/1 D; 16/35 R, 35 D

[56] References Cited

U.S. PATENT DOCUMENTS

| | | | |
|---|---|---|---|
| 189,897 | 4/1877 | Mey | 16/35 R |
| 467,873 | 1/1892 | Hughes | 16/35 R |
| 2,799,514 | 7/1957 | Kramcsak, Jr. | 16/35 R X |
| 3,070,828 | 1/1963 | Clinton et al. | 16/35 R |
| 3,636,586 | 1/1972 | Bollinger et al. | 280/79.1 X |
| 3,751,758 | 8/1973 | Higbee et al. | 280/79.1 X |
| 3,902,576 | 9/1975 | Pitan et al. | 16/35 R X |

Primary Examiner—Werner H. Schroeder
Assistant Examiner—Conrad L. Berman
Attorney, Agent, or Firm—Tilton, Fallon, Lungmus, Chestnut & Hill

[57] ABSTRACT

A self-aligning swivel caster for use on carts and the like, the caster being equipped with a member for locking and releasing the caster with respect to swivel movement. The locking and releasing member, which can selectively be oriented in an operative or an inoperative position, is friction and gravity actuated. The structural relationship of the caster and the member is such that automatic camming and actuation of the member occurs as the caster is swiveled from an unlocked position into a locked position or from a locked position into an unlocked position. During actuation of the locking and releasing member, the caster makes direct contact with the member until the member finally drops into the proper position to either restrict or facilitate further swivel movement of the caster.

15 Claims, 8 Drawing Figures

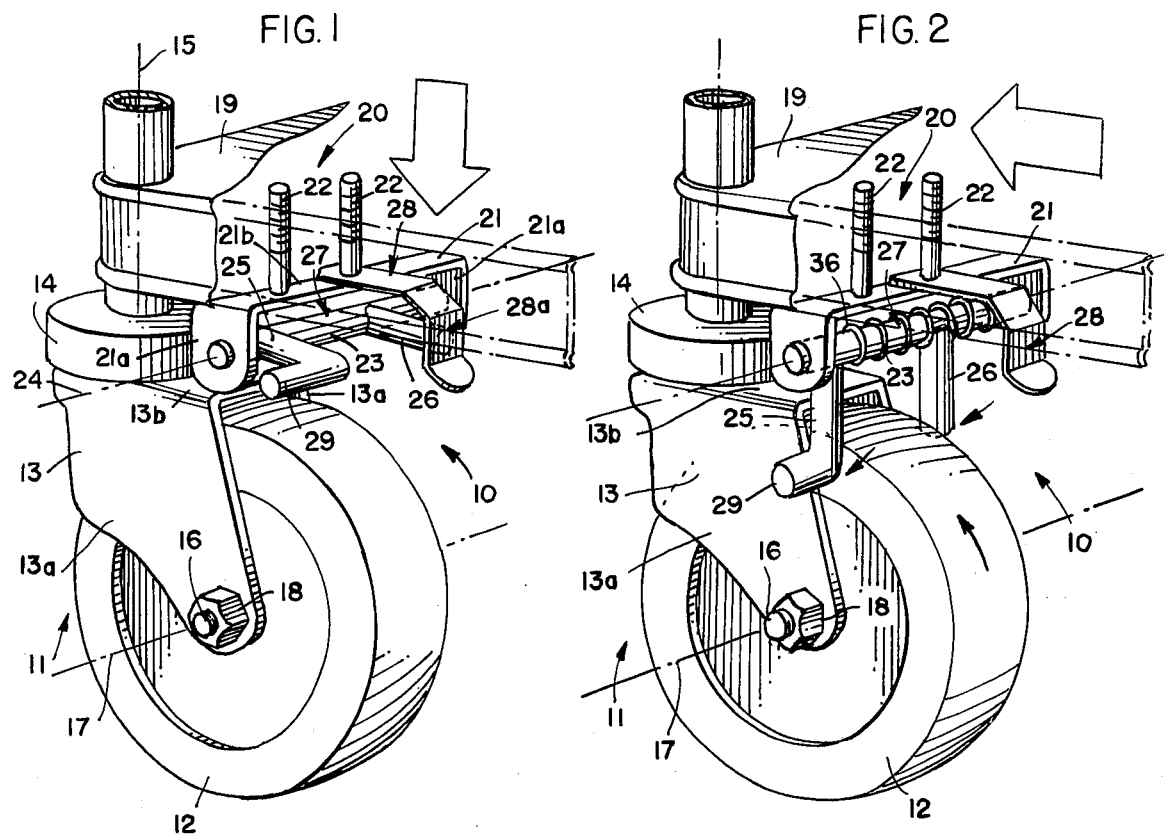
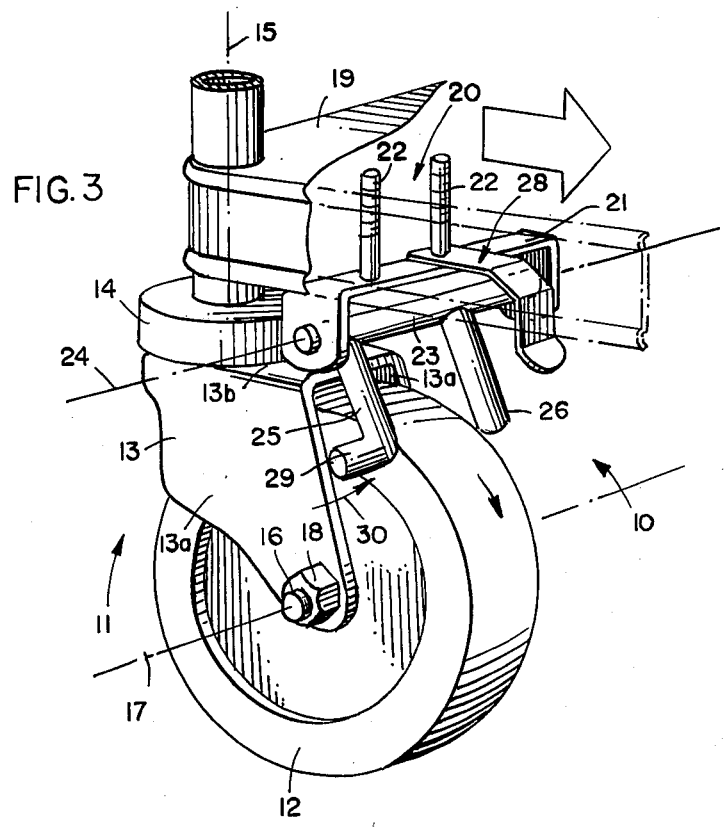

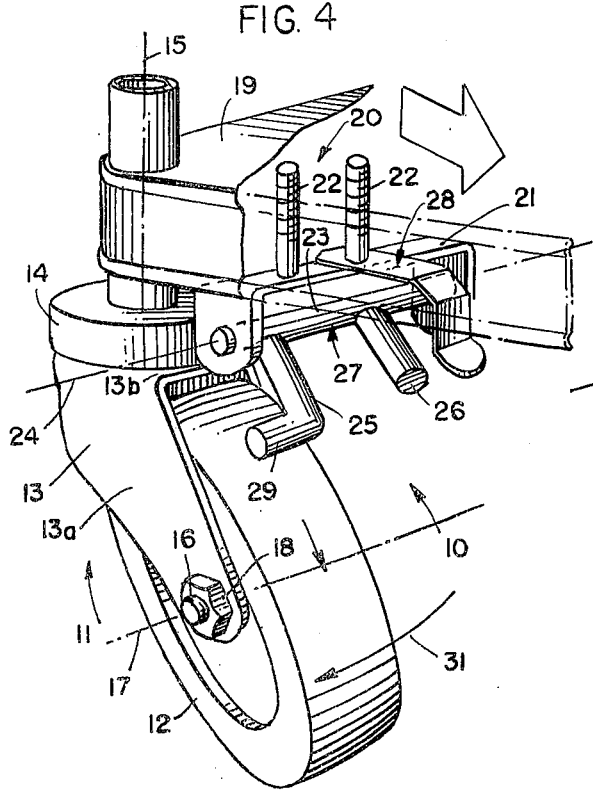
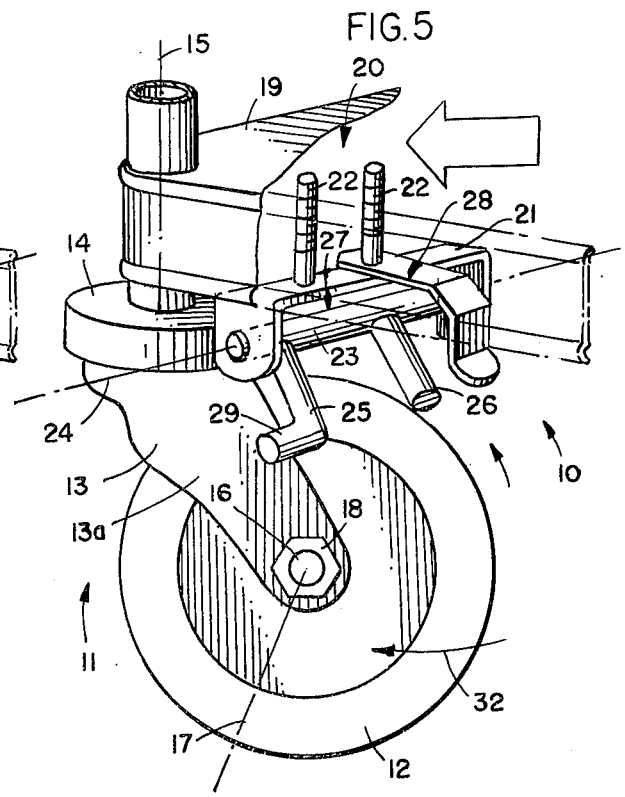
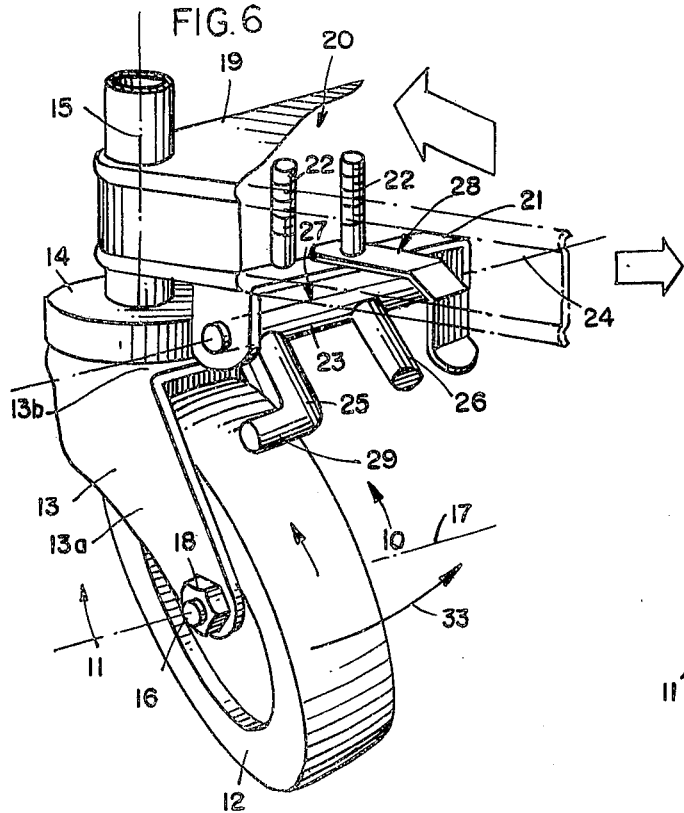
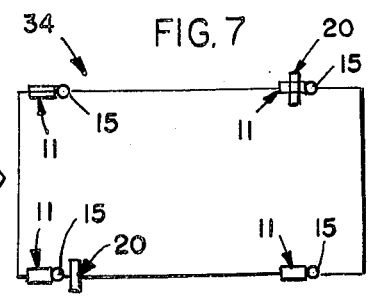
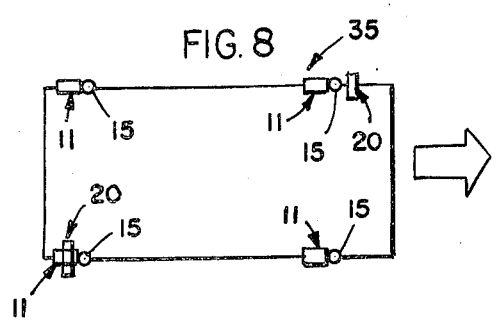

CASTER AND SWIVEL LOCK ASSEMBLY

BACKGROUND

The present invention relates to a swivel lock and more particularly to a swivel lock assembly for use with a caster.

As is well known in the art, carts and other moveable equipment are commonly provided with casters and in most instances the casters located at least at one end of such equipment are capable of swiveling so as to make that end and the equipment as a whole more manueverable. It is apparent, however, that difficulties in maintaining directional control may actually reduce the units manueverability in the event that all of the casters of the cart are free to swivel since such a cart may tend to drift laterally as it is pushed or pulled. It is equally apparent that such problems may be overcome by using non-swiveling casters at the front of a push cart or at the rear of a pull cart, but these arrangements usually result in a cart which can be easily manuevered only if it is pushed or pulled from the end equipped with the swivel casters. In many instances, especially where the equipment is relatively large and heavy or where manuevering time must be reduced as much as possible (as where such casters are used on stretchers or other emergency hospital equipment), the limitations on manueverability resulting from the provision of swivel casters at only one end may present as much of a problem as the lack of directional stability resulting from the provision of swivel casters at both ends.

The prior art is exemplified by U.S. Pat. Nos. 3,070,828; 3,636,586; and 3,751,758. Co-owned U.S. Pat. Nos. 3,636,586 and 3,751,758 reveal constructions in which a locking member cooperates with the caster in order to achieve effective automatic locking against swivel action. The present invention represents an improvement upon such prior constructions in order to achieve effective automatic releasing for swivel action as well.

SUMMARY

A caster and swivel lock assembly is provided having a locking and releasing member which permits the caster to be secured against swivel movement with the caster wheel in a longitudinally aligned position. the caster is of the self-aligning type with the wheel having a generally horizontal rotation axis spaced behind a swivel axis of the caster. The member includes a shaft having a generally horizontal pivot axis spaced above the caster wheel and behind the caster's swivel axis, and, in the preferred embodiment, the pivot axis is also disposed slightly behind the rotation axis of the wheel. The shaft is pivotally supported in position by means of a bracket that can be fixed to a cart or other equipment utilizing the caster. The caster wheel is adapted to engage at least one and preferably a pair of spaced parallel fingers which project radially from the shaft to facilitate automatic camming and actuation of the locking and releasing member as the caster is swiveled.

When the locking and releasing member is in a fully lowered or operative position, the swivel movement of a free caster into a trailing position upon reversing the direction of movement of a cart will result in engagement between one of the fingers of the member and the periphery of the caster wheel. The surface of the finger provides a smooth camming action when the finger is in direct contact with the outer edge of the wheel, and the continued swivel movement of the wheel towards the trailing position will automatically cam the member into a partially raised position. As the caster wheel fully swivels into the trailing position, the locking and releasing member is free to pivot downwardly into a fully lowered position under the influence of gravity either alone or with the aid of spring biasing means to automatically lock the wheel against further swivel movement.

When the locking and releasing member is in a fully lowered or operative position, the swivel movement of a locked caster into a trailing position upon reversing the direction of movement of a cart will likewise result in engagement between one of the fingers of the member and the periphery of the caster wheel. The surface of the finger again provides a smooth camming action when the finger is in direct contact with the outer edge of the wheel, and the continued swivel movement of the wheel into the trailing position will automatically cam the member into a partially raised position. As the caster wheel fully swivels into the trailing position, the locking and releasing member is again free to pivot downwardly into a fully lowered position to automatically release the wheel for further swivel movement.

For those applications which require it, the caster and swivel lock assembly is equipped with a spring latch for holding the locking and releasing member in a fully raised or inoperative position. The locking and releasing member can also include a horizontally projecting handle portion integral with the free end of one of the fingers for this purpose. The member can quickly and easily be brought into engagement with the spring latch by utilizing any conventional means such as lifting the handle portion with the toe.

It is therefore an object of the present invention to provide a caster and swivel lock assembly for use on carts and the like equipped with a member for automatically locking and releasing the caster with respect to swivel movement. The provision of the structure and the realization of the advantages to be derived therefrom constitute additional important objects of this invention. Other objects of the present invention can be appreciated from the details of construction and operation set forth in the accompanying specifications, claims and drawings.

DRAWINGS

The invention is described in conjunction with the accompanying drawings in which:

FIG. 1 is a perspective view of a caster and swivel lock assembly in accordance with the present invention showing a locking and releasing member in a fully raised or inoperative position;

FIG. 2 is a perspective view of the assembly of FIG. 1 showing the locking and releasing member in a fully lowered or operative position;

FIG. 3 is a perspective view of the assembly of FIG. 2 as a locked caster swivels in one direction towards a trailing position;

FIG. 4 is a perspective view of the assembly of FIG. 2 as a locked caster swivels in the other direction towards a trailing position;

FIG. 5 is a perspective view of the assembly of FIG. 2 as a free caster swivels in one direction towards a trailing position;

FIG. 6 is a perspective view of the assembly of FIG. 2 as a free caster swivels in the other direction towards a trailing position;

FIG. 7 is a diagramatic representation of a push cart in accordance with the present invention; and FIG. 8 is a diagrammatic representation of a pull cart in accordance with the present invention.

DESCRIPTION

In the illustration given and with reference first to FIG. 1, the numeral 10 designates generally a caster and swivel lock assembly in accordance with the present invention. The assembly 10 includes a conventional caster 11 which consists of a caster wheel 12, a fork or leg 13, and a swivel mount 14. The fork or leg 13 is pivotally connected to the swivel mount 14 for rotation about a generally vertical swivel axis 15. The caster wheel 12 is secured to the lower ends of the fork or leg 13 on an axle 16 having a generally horizontal rotation axis 17 by nuts 18 or other appropriate attachment means. The caster 11 so constructed is mounted in any conventional manner (not shown) to a frame member 19.

The caster 11 is of the self-aligning type since the rotation axis 17 is spaced behind the swivel axis 15 so the wheel 12 will automatically swivel into a trailing position (as shown in FIG. 2) as it is moved. The wheel 12 is preferably formed of rubber or other resilient material which cushions operation of the cart and tends to prevent skidding or slipping of the wheel on a smooth surface. Since the caster 11 is conventional and its components and structure are well known, further description of its structure and operation except to the extent that they bear directly on the cooperative relationship between the caster 11 and the assembly 10 is believed unnecessary.

As shown in the figures, the fork 13 of the caster 11 has a bifurcated configuration. The fork 13 includes depending side portions 13a (as best shown in FIG. 3) and a generally horizontal connecting portion 13b. The connection portion 13b is positioned beneath the swivel mount 14 and is preferably formed integral with the depending side portions 13a.

The swivel lock portion of the assembly 10 is generally designated by the numeral 20 and includes a bracket 21 attached to the frame 19 separate and apart from the caster 11. The bracket 21, which is positioned behind the caster 11 to facilitate the locking and releasing procedure later to be described, is generally U-shaped having depending side portions 21a and a generally horizontal connecting portion 21b. The bracket 21 is attached to the frame member 19 by bolts 22 (shown in part) extending through suitable apertures in the connecting portion 21b.

The side portions 21a of the bracket 21 are likewise apertured to receive and support a horizontal shaft 23. The shaft 23 which is mounted on the bracket 21 for pivotal movement about a generally horizontal pivot axis 24, has at least one and preferably a pair of spaced fingers 25 nad 26 (as best shown in FIG. 2) extending radially therefrom for a distance less than the radius of the wheel 12. As shown in the drawings, there are two refiners 25 and 26 which are substantially parallel and spaced apart a distance slightly greater than the width of the wheel 12.

The bracket 21, shaft 23 and fingers 25 and 26 together constitute an automatic locking and releasing member 27. The pivot axis 24 of the shaft 23 is disposed slightly behind the rotation axis 17 of the wheel 12 in order to facilitate locking and releasing the member 27 while at the same time avoiding engagement of the fingers 25 and 26 with the fork 13. The surface of the fingers 25 and 26 cooperate with the periphery of the wheel 12 to further facilitate locking and releasing the member 27 during use in a manner which will be explained in more detail below.

Referring again to FIG. 1, the locking and releasing member 27 is illustrated in a fully raised or inoperative position. The fingers 25 and 26 extend rearwardly in the fully raised position well above the wheel 12 and free of engagement therewith. Retaining or latching means in the form of a spring latch 28 serves to frictionally maintain the locking and releasing member 27 in the fully raised position. The spring latch 28 is fixed to the bracket 21 which is, in turn, attached to the frame member 19 as described previously.

The spring latch 28 includes a flange portion 28a extending downwardly and rearwardly to engage the free end of at least one of the fingers 26 when the locking and releasing member 27 is in the fully raised or inoperative position. The latching force of the spring 28 can be overcome whenever desired, however, by utilizing a horizontally projecting handle portion 29 which can be provided integral with the free end of one of the fingers 25. The handle portion 29 can simply be urged (as shown in FIG. 1) to to disengage the free end of the finger 26. The locking and releasing member 27 can thereafter be permitted to drop downwardly under the influence of gravity to a fully lowered or operative position.

It is to be understood that the bracket 21 and the spring latch 28 secured thereto may be attached together by welding or by any other suitable means. The bracket 21 is secured to the frame member 19 by bolts 22 as previously described and the spring latch 28 can likewise be secured to the bracket 21 and the frame member 19 by utilizing one of the bolts 22 in conventional manner. Of course, any other mounting arrangement would suffice if it meets essential criteria of this invention.

An important aspect of this invention lies in the fact that the member 27 is pivotally mounted and positioned for automatically locking and releasing the wheel 12 with respect to swivel movement. The bracket 21 supports the shaft 23 for pivotal movement of the member 27 between a locking position (as shown in FIG. 2) wherein the fingers 25 and 26 are lowered to straddle the wheel 12 and a releasing position (as shown in FIG. 4) wherein the fingers 25 and 26 are raised above the wheel 12. The wheel 12 which has a normal tendency to assume a trailing position cooperates with the fingers 25 and 26 to provide the locking and releasing feature of the member 27.

In operation of the present invention on a cart or other equipment, the caster 11 which has been locked against swivel movement in a trailing position (as shown in FIG. 2) will tend to swivel to a new trailing position if the direction of movement of the cart is reversed. The caster 11 can swivel about the axis 15 (as shown in FIG. 3) in a counter-clockwise direction represented by the arrow 30. As it swivels, the periphery of the caster wheel 12 will directly engage the inner surface of the finger 26. The rotation of the wheel 12 will then impart movement to the finger 26 as the cart is rolled in the direction indicated to cam the member 27 upwardly about the axis 24 into a partially raised or releasing position. The member 27 will be retained in that position by the wheel 12 until the wheel 12 has swiveled further towards a new trailing position at which time the member 27 will pivot downwardly under the influence of gravity. The caster 11 will thereafter be free to undergo full swivel movement for purposes of guiding the cart.

Similarly, the caster 11 can swivel about the axis 15 (as shown in FIG. 4) in a clockwise direction represented by the arrow 31. As it swivels, the periphery of the caster wheel 12 will directly engage the inner surface of the finger 25. The rotation of the wheel 12 around the axis 15 will then impart movement to the finger 25 as the cart is rolled in the direction indicated to cam the member 27 upwardly about the axis 24 into a partially raised or releasing position. The member 27 will be retained in that position by the wheel 12 until the wheel 12 has swiveled further towards a new trailing position at which time the member 27 will pivot downwardly under the influence of gravity. The caster 11 will again thereafter be free to undergo full swivel movement for purposes of guiding the cart.

The caster 11 which has been free for swivel movement in a trailing position will likewise tend to swivel to a new trailing position if the direction of movement of the cart is reversed. The caster 11 can swivel about the axis 15 (as shown in FIG. 5) in a clockwise direction represented by the arrow 32. As it swivels, the periphery of the caster wheel 12 will directly engage the outer surface of the finger 26. The rotation of the wheel 12 around the axis 15 will then impart movement to the finger 26 as the cart is rolled in the direction indicated to cam the member 27 upwardly about the axis 24 into a partially raised or releasing position. The member 27 will be retained in that position by the wheel 12 until the wheel 12 has swiveled further towards a new trailing position at which time the member 27 will pivot downwardly under the influence of gravity from its raised position into its locking position (as shown in FIG. 2). The caster 11 will thereafter be locked against further swivel movement for purposes of stabilizing movement of the cart by gravity and the rotation of the wheel 12 around the axis 17.

Similarly, the caster 11 can swivel about the axis 15 (as shown in FIG. 6) in a counter-clockwise direction represented by the arrow 33. As it swivels, the periphery of the caster wheel 12 directly engages the outer surface of the finger 25 (or the under surface of the handle portion 29 projecting horizontally from the free end of the finger 25 in the event that it is used). The rotation of the wheel 12 around the axis 15 will then impart movement to the finger 25 (or the handle portion 29) as the cart is rolled in the direction indicated to cam the member 27 upwardly about the axis 24 into a partially raised or releasing position. The member 27 will be retained in that position by the wheel 12 until the wheel 12 has swiveled further towards a new trailing position at which time the member 27 will pivot downwardly under the influence of gravity from its raised position into its locking position (as shown in FIG. 2). The caster 11 will again thereafter be locked against further swivel movement for purposes of stabilizing movement of the cart by gravity and the rotation of the wheel 12 around the axis 17.

The automatic camming and actuation of the locking and releasing member may be utilized by arranging the casters in various ways depending on the manner in which a particular cart is intended to be used. It is advantageous, however, to lock at least one of the casters at one end of the cart in order to maintain straight line tracking with the casters at the other end of the cart free in order to facilitate steering. Accordingly, the cart can be provided with lockable casters on diagonally opposite corners.

The swivel locks of the present invention are particularly useful with carts which are usually pushed. They can be modified, however, to permit convenient use in connection with a pull cart as well by simply rearranging the locks and attaching them to the cart in suitable locations. The swivel locks will be so arranged and placed as to facilitate steering of the cart.

Referring to FIG. 7, a push cart 34 is shown in diagramatic fashion provided with four casters 11 and two swivel locks 20. The casters 11 are located in typical fashion near the corners of the cart 34. The swivel locks 20 are provided adjacent diagonally opposite casters 11.

The push cart 34 must have at least one front caster 11 locked in a trailing position in order to maintain straight line tracking with the rear casters 11 being free to swivel in order to facilitate steering. The swivel locks 20 associated with the push cart 34 are therefore arranged and placed inboard of the swivel axes 15 of the corresponding casters 11. The swivel lock 20 associated with the front caster 11 of the push cart 34 will then automatically lock while the swivel lock 20 associated with the rear caster 11 of the cart 34 will automatically release. When the motion of the cart 34 is reversed, the formerly released rear caster becomes a front caster which will automatically lock and the formerly locked front caster becomes a rear caster which will automatically release. The push cart 34 will therefore maintain straight line tracking while at the same time facilitating steering regardless of the direction the cart is being pushed.

Referring to FIG. 8, a pull cart 35 is shown in diagramatic fashion provided with four casters 11 and two swivel locks 20. The casters 11 are again located in typical fashion near the corners of the cart 35. The swivel locks 20 are again provided adjacent diagonally opposite casters 11.

The pull cart 35 must have at least one rear caster 11 locked in a trailing position in order to maintain straight line tracking with the front casters 11 being free to swivel in order to facilitate steering. The swivel locks 20 associated with the pull cart 35 are therefore arranged and placed outboard of the swivel axes 15 of the corresponding casters 11. The swivel lock 20 associated with the rear caster 11 of the pull cart 35 will then automatically lock while the swivel lock 20 associated with the front caster 11 of the cart 35 will automatically release. When the motion of the cart 35 is reversed, the formerly released front caster becomes a rear caster which will automatically lock and the formerly locked rear caster becomes a front caster which will automatically release. The pull cart 35 will therefore likewise maintain straight line tracking while at the same time facilitating steering regardless of the direction the cart is being pulled.

The caster and swivel lock assembly of the present invention also contemplates further possible modifications utilizing the inventive concepts set forth. The shaft 23 can be provided as a formed rod which pivots on small pins in the bracket 21. The locking and releasing member 27 can include only a single finger which is preferably the outboard finger 25 projecting from the shaft 23, but the use of one finger advantageously requires a swivel lock assembly 10 associated will all of the casters 11 on a push cart 34. The locking and releasing member 27 can also include spring biasing means 36

(as shown in FIG. 1) in the form of a tension, torsion, or leaf style spring in conventional spring fashion for cooperating with gravity to urge the finger 25 or fingers 25 and 26 downwardly into a fully lowered position. The fork 13 of the caster 11 shown in the drawings can be a single leg support in accordance with available casters. The caster and swivel lock assembly of the present invention can therefore take various forms while at the same time enjoying the advantages to be derived from the inventive concepts set forth.

The present invention provides a swivel lock which completely eliminates the need for the user to manually lock or release the casters used on a cart thereby saving time and effort which can be of great importance in certain applications such as emergency hospital equipment. The swivel lock may also be temporarily deactivated if desired by fully raising the locking and releasing member to an inoperative position in order to prevent any engagement of the swivel lock with the casters. While in the foregoing specification, a detailed description of the invention has been set forth for the purpose of illustration, variations of the details herein given may be made by those skilled in the art without departing from the spirit and scope of the invention.

I claim:

1. A swivel caster assembly including a swivel mount, a leg connected to said swivel mount for swivel movement about a generally vertical swivel axis, and a wheel supported by said leg for rotational movement about a generally horizontal rotation axis, said rotation axis being spaced behind said swivel axis when said wheel is in a trailing position, the improvement wherein a locking and releasing member is pivotally mounted and positioned for automatically releasably locking said wheel in said trailing position, said member comprising a shaft and a finger projecting radially therefrom, means supporting said shaft for pivotal movement about a generally horizontal pivot axis between a locking position wherein said finger is lowered and a releasing position wherein said finger is raised above said wheel, said shaft having said pivot axis disposed behind said swivel axis, said finger being directly engageable with the periphery of said wheel when said finger is lowered and when said wheel is swiveled towards said trailing position in one direction to ride upon said wheel and thereby promote smooth movement of said member from a lowered to a partially raised position above said wheel, said member pivoting under the influence of gravity from said partially raised position into said locking position as said wheel fully reaches said trailing position, and said finger thereafter being directly engageable with the periphery of said wheel when said finger is lowered and when said wheel is swiveled towards a new trailing position in the other direction to ride upon said wheel and thereby promote smooth movement of said member from a lowered to a partially raised position above said wheel, said member pivoting under the influence of gravity from said releasing position into said lowered position as said wheel fully reaches said new trailing position.

2. The structure of claim 1 in which said locking and releasing member includes spring biasing means for cooperating with gravity to urge said finger downwardly into said lowered position.

3. The structure of claim 1 in which said wheel of said caster assembly is supported by a fork.

4. The structure of claim 1 in which said pivot axis of said shaft is spaced from said swivel axis.

5. The structure of claim 4 in which said pivot axis of said shaft is disposed slightly behind said rotation axis of said wheel when said wheel is in said first-mentioned trailing position.

6. A swivel caster assembly including a swivel mount, a leg connected to said swivel mount for swivel movement about a generally vertical swivel axis, and a wheel supported by said leg for rotational movement about a generally horizontal rotation axis, said rotation axis being spaced behind said swivel axis when said wheel is in a trailing position, the improvement wherein a locking and releasing member is pivotally mounted and positioned for automatically releasably locking said wheel in said trailing position, said member comprising a shaft and a pair of spaced parallel fingers projecting radially therefrom, means supporting said shaft for pivotal movement about a generally horizontal pivot axis between a locking position wherein said fingers are lowered to straddle said wheel and a releasing position wherein said fingers are raised above said wheel, said shaft having said pivot axis disposed behind said swivel axis, one of said fingers being directly engageable with the periphery of said wheel when said fingers are lowered and when said wheel is swiveled towards said trailing position to ride upon said wheel and thereby promote smooth movement of said member from a lowered to a partially raised position above said wheel, said member pivoting under the influence of gravity from said partially raised position into said locking position as said wheel fully reaches said trailing position, and one of said fingers thereafter being directly engageable with the periphery of said wheel when said fingers are lowered and when said wheel is swiveled towards a new trailing position to ride upon said wheel and thereby promote smooth movement of said member from a lowered to a partially raised position above said wheel, said member pivoting under the influence of gravity from said releasing position into said lowered position as said wheel fully reaches said new trailing position.

7. The structure of claim 6 in which said locking and releasing member includes spring biasing means for cooperating with gravity to urge said fingers downwardly into said lowered position.

8. The structure of claim 6 in which said wheel of said caster assembly is supported by a fork.

9. The structure of claim 6 in which said periphery of said wheel is formed of a resilient skid-resilient material.

10. The structure of claim 9 in which said periphery of said wheel is formed of rubber.

11. The structure of claim 6 in which means are provided for releasably holding said locking member in a fully raised position.

12. The structure of claim 11 in which at least one of said fingers is provided at the free end thereof with a horizontally projecting handle portion.

13. The structure of claim 12 in which said means for releasably holding said locking member in its fully raised position comprises a spring latch frictionally engageable with at least one of said fingers when said fingers are fully raised.

14. The structure of claim 6 in which said pivot axis of said shaft is spaced from said swivel axis.

15. The structure of claim 14 in which said pivot axis of said shaft is disposed slightly behind said rotation axis of said wheel when said wheel is in said first-mentioned trailing position.

* * * * *